A. L. McGREGOR.
AUTOMOBILE BUMPER.
APPLICATION FILED JAN. 17, 1921.
1,372,154. Patented Mar. 22, 1921.
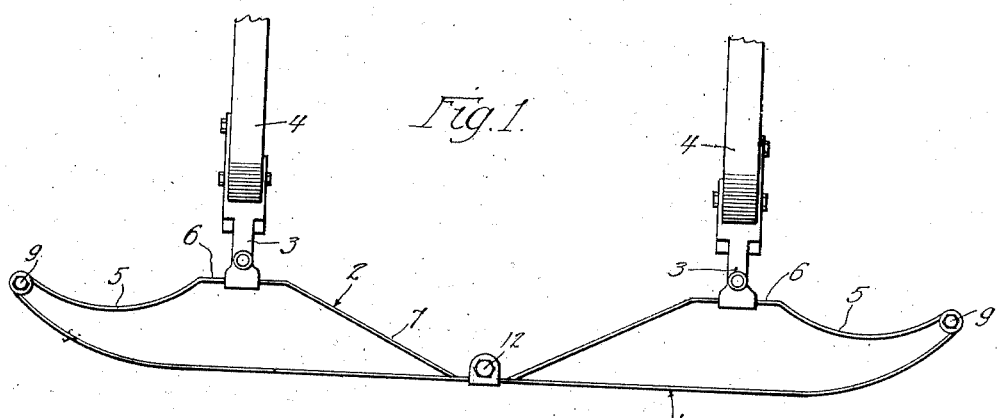
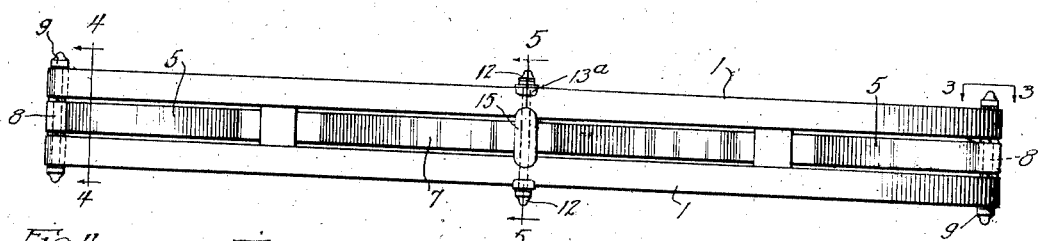
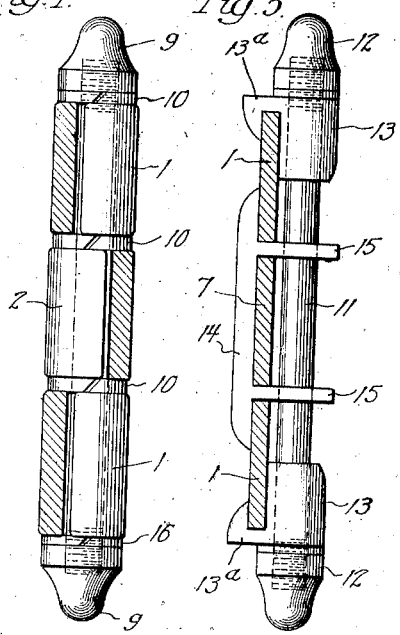
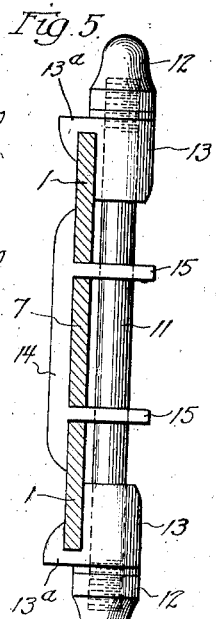
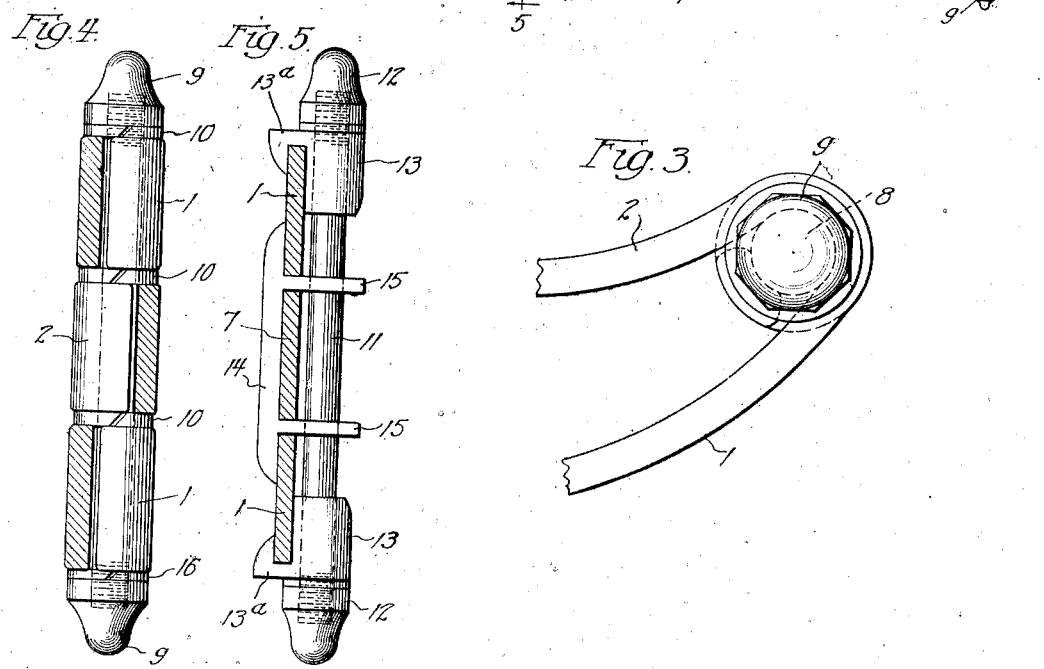
Inventor
Allan L. McGregor.
By:
Offield, Poole & Hunter
Attys

UNITED STATES PATENT OFFICE.

ALLAN L. McGREGOR, OF CHICAGO, ILLINOIS.

AUTOMOBILE-BUMPER.

1,372,154.

Specification of Letters Patent.

Patented Mar. 22, 1921.

Application filed January 17, 1921. Serial No. 437,734.

*To all whom it may concern:*

Be it known that I, ALLAN L. McGREGOR, a citizen of the United States, and a resident of Chicago, in the county of Cook and State of Illinois, have invented certain new and useful Improvements in Automobile-Bumpers, of which the following is a specification.

This invention relates to improvements in automobile bumpers of the so-called resilient type, and characterized by a wide impact surface consisting of at least two resilient bars spaced apart vertically and extending throughout the length of the bumper.

The object of the invention is to provide a construction for a bumper which will afford the maximum degree of protection to the vehicle, not only by providing a greater protective area, but also by assembling the parts in such a manner as to absorb the force of impact and distribute the same uniformly throughout the entire structure.

A preferred type of bumper having the characteristics above mentioned, is illustrated in the accompanying drawings, in which—

Figure 1 is a top plan view of a bumper as attached to the frame of a motor vehicle, Fig. 2 is a view in front elevation of the bumper, Fig. 3 is an enlarged top plan view of one end portion of the bumper, Fig. 4 is an enlarged detailed view in vertical section taken on line 4—4 of Fig. 2, and Fig. 5 is a similar view taken on line 5—5 of Fig. 2.

The bumper comprises in general an impact member made up of two resilient bars 1—1 extending throughout the full length of the bumper, and spaced apart vertically in parallel relation. The ends of the parallel bars 1—1 are connected together by members hereinafter to be described, and in such manner as to form a separate impact unit. Connecting the outer ends of the impact member is a bar 2 spaced rearwardly from the impact member, and adapted to have direct connection with brackets 3—3 mounted at the ends of the frame members 4—4 of a motor vehicle. The bar 2 extends throughout the entire length of the bumper, although it is shaped to provide different portions which may be distinguished as follows: Between the ends of the bumper and the points of connection with the brackets 3—3, the bar is curved in a forward direction throughout the portions 5—5, and adjacent the brackets 3—3, straight portions 6—6 extending parallel to the impact member are provided for the purpose of engaging the brackets 3—3. The central portion of the bar 2 intermediate the portions 6—6, is bent in U-shape, and in a forward direction, the apex of this V-shaped central portion 7 lying between and in the vertical plane of the bars 1—1 of the impact member.

At the ends of the bumper and midway between its ends are provided connecting members which may be described as follows: The connecting members at the ends of the bumper comprise pins 8 which engage eyes formed at the ends of the bars 1—1, these pins being provided at their ends with screw caps 9—9, and resemble somewhat the ordinary hinge pin such as used in door hinges. Surrounding the pins 8—8 intermediate the ends of the bars 1—1 are the extremities of the rear bar 2, these being also bent in the form of eyes. Between the extremities of the several bars are preferably inserted washers 10. This type of connection manifestly permits a certain degree of rotation between the pins and the ends of the bar; thus this connection may be termed as pivotal or hinged.

A similar form of connection is used at the central portion of the bumper for the purpose of anchoring the apex of the portion 7 of the rear bar 2 between the parallel bars 1—1. This particular connection, shown in Fig. 5, comprises a pin 11 having removable screw caps 12 at its ends. Mounted on this pin is a pair of blocks 13—13 having hooked portions 13ª—13ª, which engage the outer edges of the bars 1—1. Between the blocks 13—13, which occupy positions adjacent the ends of the pin, is mounted a locking plate 14 bearing against the faces of the bars 1—1 and 7, and provided with integral ears 15—15 which project between the adjacent edges of the bars and engage the pin 11 by means of apertures formed in said ears. In this manner the parallel bars 1—1 are securely tied together at their central point and the central portion of the rear bar is firmly anchored between the bars 1—1 through the medium of the locking plate 14.

A bumper constructed in this manner has the advantage of a wide impact area extending throughout its entire length, thus affording the maximum protective area, and at the same time having an ample degree of resiliency to effectively and yieldingly resist the force of impacts received. The presence of the V-shaped portion 7 of the rear bar, and its connection with the central portion of the impact member, increases the strength and rigidity of the structure, and provides for the equal distribution of the shock throughout the entire bumper.

Having described the construction of a bumper embodying the invention, I claim:

1. In a bumper, the combination of an impact section comprising a plurality of parallel bars extending the length of the bumper, and a bar spaced rearwardly from said impact section and connected at its ends to the ends of said impact section, and having its central portion offset forwardly and connected to said impact section intermediate the ends thereof.

2. In a bumper, the combination of an impact section comprising a plurality of parallel bars spaced apart in vertical relation, and extending throughout the length of the bumper, a single bar having pivotal connection with the ends of said impact section, and extending inwardly for attachment to the frame members of a vehicle, the central portion of said single bar being offset forwardly and connected with the central portion of said impact section.

3. In a bumper, the combination of an impact section comprising a pair of resilient bars spaced apart vertically, pins extending through eyes formed at the ends of said bars, a single bar having pivotal connection at its ends with pins and spaced rearwardly of said impact section for connection with the frame members of a vehicle, the central portion of said single bar being offset forwardly and fixed to the bars of said impact section.

4. In a bumper, the combination of an impact section comprising a pair of parallel bars spaced apart vertically throughout the length of the bumper, and provided at their ends with eyes, pins extending through the eyes at the ends of said bars, a rearwardly spaced bar having pivotal connection at its ends with said pins, and having a V-shaped central portion extending toward the impact section, and means for fixing the apex of said V-shaped portion to and between said bars of the impact section.

5. In a bumper, the combination of resilient bars spaced apart vertically throughout the length of the bumper, pins connecting the ends of said bars, a single resilient bar pivotally connected at its ends with said pins intermediate the ends of said parallel bars, said single bars extending inwardly to form a portion adapted for connection with the frame members of a vehicle, and having a V-shaped central portion extending forwardly, and terminating at its apex between said parallel bars, and a clamping member connecting said bars together centrally of the bumper.

In witness whereof, I hereunto subscribe my name this 11th day of January, A. D., 1921.

ALLAN L. McGREGOR.